UNITED STATES PATENT OFFICE.

JOHN CHARLES DE VOY, OF SANDWICH, MASSACHUSETTS, ASSIGNOR, BY MESNE ASSIGNMENTS, TO THE VASA MURRHINA ART GLASS COMPANY, OF HARTFORD, CONNECTICUT.

MANUFACTURE OF GLASSWARE.

SPECIFICATION forming part of Letters Patent No. 301,100, dated July 1, 1884.

Application filed October 3, 1883. Renewed April 23, 1884. (No specimens.)

*To all whom it may concern:*

Be it known that I, JOHN C. DE VOY, of Sandwich, in the county of Barnstable, State of Massachusetts, have invented a certain new and useful Improvement in the Manufacture of Glassware, of which the following is a description sufficiently full, clear, and exact to enable any person skilled in the art or science to which said invention appertains to make and use the same.

My invention relates more especially to means for ornamenting glassware and articles composed of glass; and it consists in the employment of mica, as hereinafter more fully set forth and claimed, by which the article decorated is given the appearance of silver at a merely nominal expense.

The nature of the improvement will be readily understood by all conversant with such matters from the following explanation.

In carrying out my invention I take thin sheets or particles of mica and coat them with silver by immersing them in a bath of nitrate of silver for about forty-eight hours, after which they are removed and dried. I then take, on the end of an ordinary glass-blower's iron, a ball of metal from the furnace and roll it over the thin sheets or particles of silver-coated mica. The ball is then submitted to intense heat in a glass or other suitable furnace, thereby causing the glass to flow over the mica and firmly adhere thereto, after which it is blown, pressed, or manufactured into vases or other ware, or articles of glass, in the usual manner.

I do not confine myself to coating the mica with silver alone, as gold, nickel, copper, or other metals may be used instead, if preferred, the metal being deposited on the mica by the ordinary electroplating process, or in any other suitable manner. The mica, after being coated, may also be polished, if desired.

Having thus explained my invention, what I claim is—

1. The improved process of ornamenting glassware and articles of glass herein described, the same consisting, essentially, in coating sheets or particles of mica with silver, gold, copper, or nickel, incorporating the coated mica with the ball of metal or glass, and subjecting the same to heat to cause the glass to flow over and adhere to the mica, substantially as set forth.

2. A vase or other article composed of glass, when ornamented or decorated by means of mica coated with metal, the mica being incorporated in the body or substance of the article ornamented, substantially as set forth.

JOHN CHARLES DE VOY.

Witnesses:
 C. A. SHAW,
 L. J. WHITE.